United States Patent [19]

Ligas

[11] Patent Number: 5,123,668
[45] Date of Patent: Jun. 23, 1992

[54] BICYCLE TRAILER HITCH

[75] Inventor: Alexander Ligas, St. Petersburg, Fla.

[73] Assignee: Decomesh Corporation, Largo, Fla.

[21] Appl. No.: 686,137

[22] Filed: Apr. 16, 1991

[51] Int. Cl.$^5$ ............................................. B62K 27/00
[52] U.S. Cl. ....................................... 280/204; 280/65
[58] Field of Search ................... 280/204, 292, 63, 65, 280/47.26, 504, 515, 664, 651, 652, 656, 79.2

[56] References Cited

U.S. PATENT DOCUMENTS

| | | | |
|---|---|---|---|
| 2,725,242 | 11/1955 | Peplin | 280/204 |
| 3,993,321 | 11/1976 | Cote | 280/204 |
| 3,999,777 | 12/1976 | McGrath, Jr. | 280/204 |
| 4,077,646 | 3/1978 | Watkins | 280/204 |
| 4,266,793 | 5/1981 | Pryor | 280/204 |
| 4,274,649 | 6/1981 | Vander Horst et al. | 280/204 |
| 4,342,467 | 8/1982 | Kester | 280/204 |
| 4,756,541 | 7/1988 | Albitre | 280/204 |
| 5,076,600 | 12/1991 | Fake | 280/204 |

Primary Examiner—David H. Bollinger
Attorney, Agent, or Firm—Herbert W. Larson

[57] ABSTRACT

A trailer hitch and cart suspension system are combined to provide a stable bicycle towing apparatus. The cart is in cantilevered engagement to a yoke attached to two pairs of tension rods extending rearwardly from each side of the yoke. Each pair of tension rods engage opposite exterior and interior sides of a wheel axle and each side of the cart is located over an interior tension rod. An upwardly curved tow bar connects to a rod having a swivel connector at a point distal from the tow bar. The swivel connector mounts over a pin projecting upwardly from bicycle frame members over a rear wheel of the bicycle.

3 Claims, 4 Drawing Sheets

BICYCLE TRAILER HITCH

BACKGROUND OF THE INVENTION

1. Field of the Invention

This invention relates to a bicycle trailer hitch apparatus. More particularly, it refers to a suspension and hitch apparatus for connecting a two wheel bike to a two wheel cart.

2. Description of the Prior Art

Many attempts have been made to produce a bicycle trailer hitch that is practical to manufacture and provides the optimum balance between the bicycle and its pulling load. Examples of these attempts are set forth in the following U.S. Pat. Nos. 2,725,242; 3,993,321; 3,999,777; 4,077,646; 4,266,793; 4,274,649; and 4,342,467. However, not a single one of these descriptions combines individual trailer wheel suspensions, a turning radius of more than 180 degrees, a swivel radius of 360 degrees, or an up and down pitch of more than a few degrees. An improved bike trailer hitch assembly and combined suspension assembly for its trailer is needed.

SUMMARY OF THE INVENTION

I have invented an improved bicycle trailer hitch and suspension assembly that permits the pulling bicycle to fall flat on its side without causing binding of the hitch assembly or causing the trailer load to be dumped.

My hitch and suspension assembly for a bicycle trailer combination has a yoke to which a front wall of a cart is attached in a cantilevered manner. The yoke has attached at opposite ends parallel pairs of interior and exterior tension rods, each pair extending rearwardly to a wheel with the interior rod attached to an interior end of the wheel's axle and the exterior rod attached to an exterior end of the wheel's axle. An upwardly curved tow bar is attached at a first end to a middle portion of the yoke and at a second end to a rod. A bracket attached to a lower portion of the tow bar is also attached to the front wall of the cart. The second hollow end of the tow bar has a rod permanently mounted therein with the rod having an integral swivel connector at an end distal from the tow bar. The swivel connector is mounted over an upright pin mounted to the bicycle frame over the rear wheel and is kept in position by a clip mounted through a bore in a top portion of the pin.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
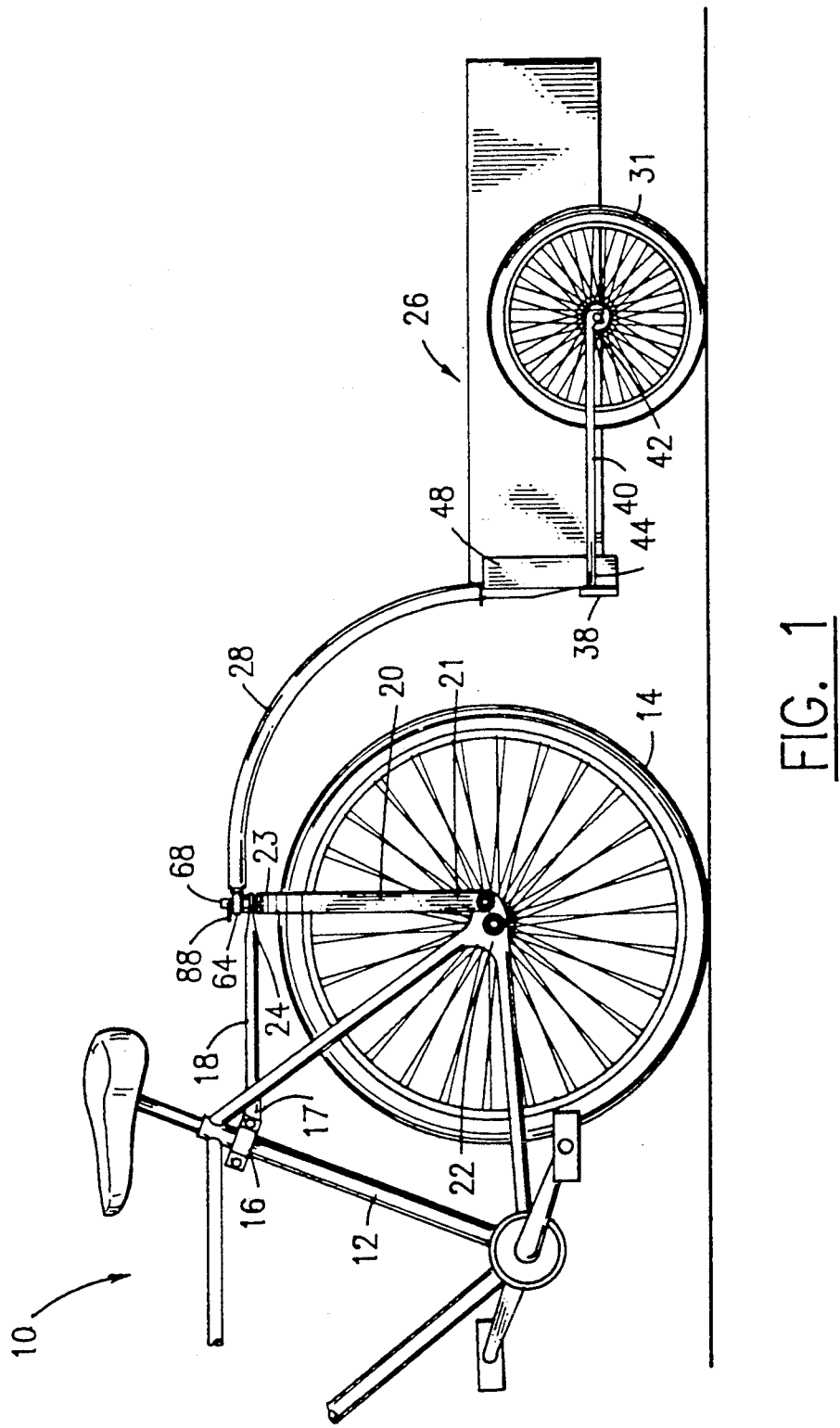
FIG. 1 is a left side elevational view of a back end of a bicycle hitched to a cart with the hitch and suspension apparatus of this invention.
Figure 2:
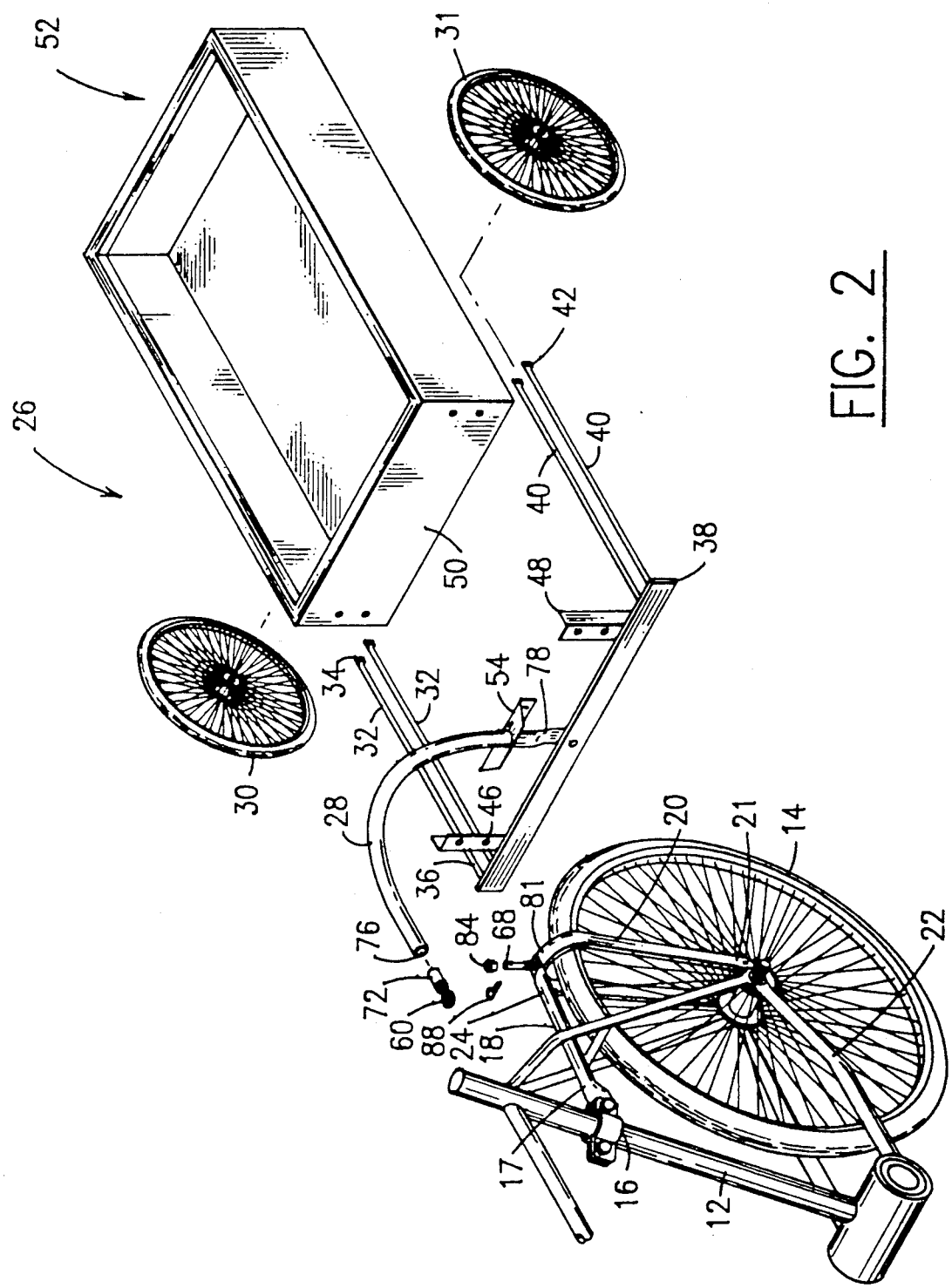
FIG. 2 is an exploded view of the hitch assembly and suspension apparatus.

Throughout the following detailed description, the same reference numerals refer to the same elements in all figures.

Referring first to FIG. 1, the bicycle 10 has a standard vertical support member 12 and rear wheel 14. The hitch assembly of the invention has a clamp 16 attaching a first end 17 of a lateral stabilizer bar 18 to the bicycle vertical support member 12. A U-shaped vertical support brace 20 attaches at a first end 21 to each side of a bicycle lower frame member 22, exterior of the bicycle rear wheel hub, and at its second end 23 to the second end 24 of the lateral stabilizer bar 18.

Figure 3:
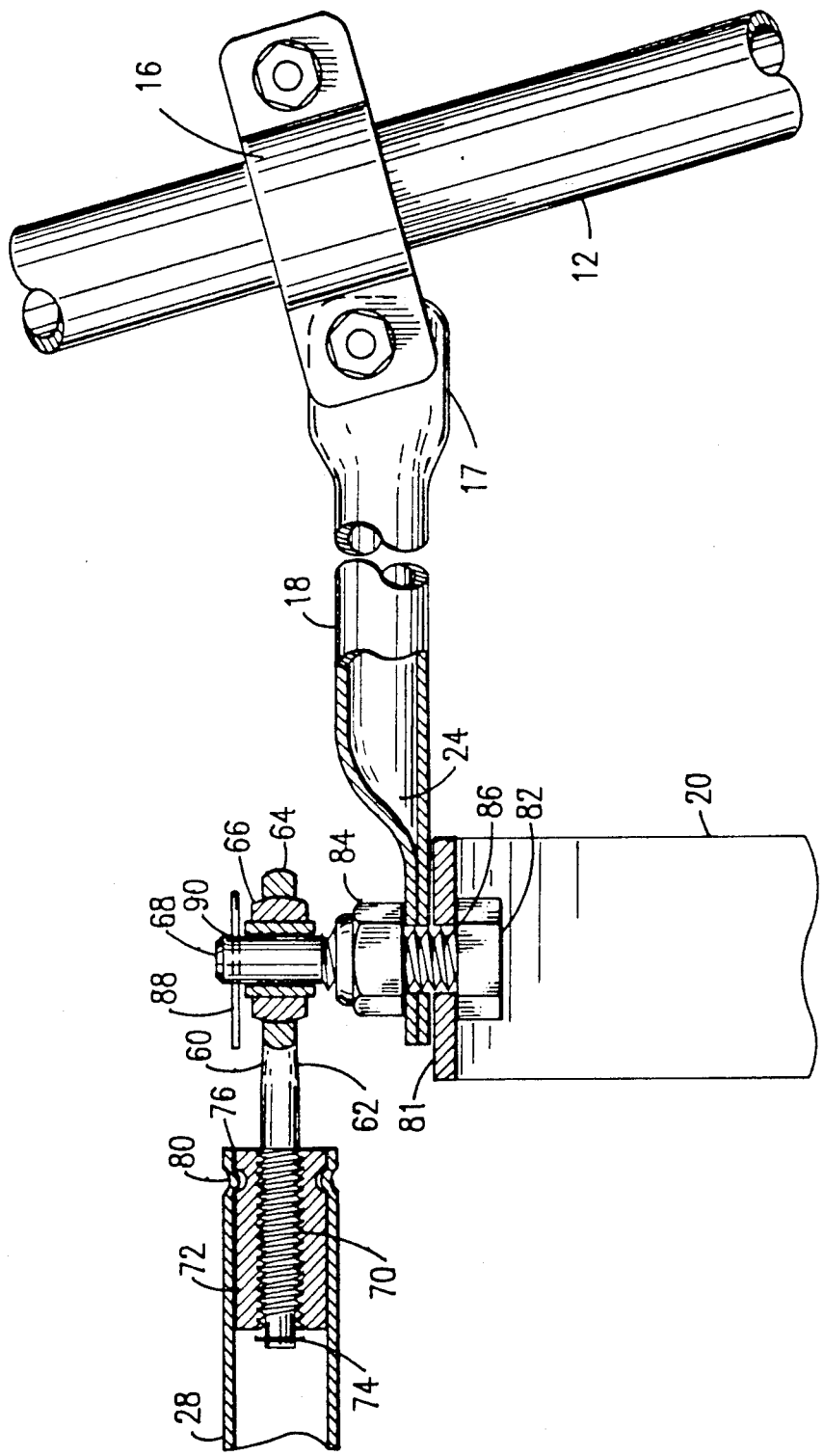
FIG. 3 is a right side sectional view of the hitch assembly.

The hitch assembly shown in FIG. 3 connects the bicycle 10 to the trailer chassis assembly 26, by way of a tow bar 28. The trailer chassis assembly 26 has a pair of fifteen inch diameter wheels 30 and 31 with a right side pair of tension rods 32 attached by a bolt at a first end 34 to each side of wheel 30 and at a second end 36 by a weld or braze to a front yoke plate 38. A left side pair of tension rods 40 are attached by a bolt at a first end 42 to each side of wheel 31 and at a second end 44 by a weld or braze to the front yoke plate 38. Right side bracket 46 and left side bracket 48 welded to yoke 38 are bolted to the front end 50 of the cart frame body 52 at each front corner. In addition, cart brace 54, brazed or welded to tow bar 28, is bolted to the front end 50 of cart frame body 52. The cart 52 is supported by the brackets 46, 48 and brace 54 and the side walls are located over the interior tension rods of pairs 32 and 40. In this manner, the chassis 26 has an individual wheel suspension system with the cart 52 attached on front end 50 only. The cart 52 is thus cantilevered. Different size and shape carts 52 can be employed depending on the objects to be carried.

Figure 4:
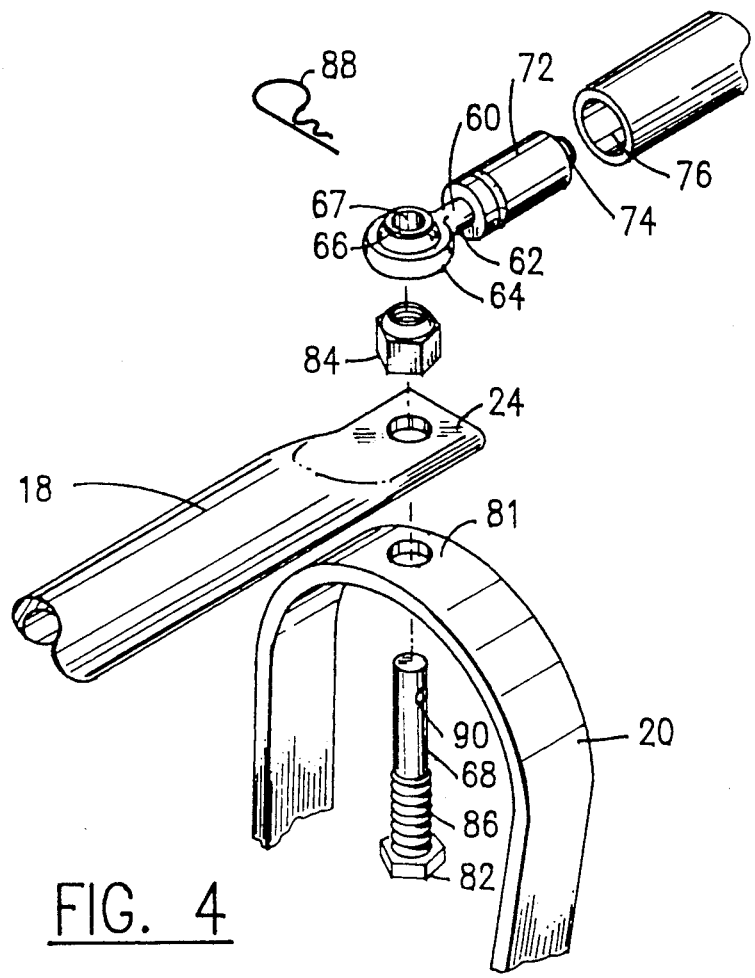
FIG. 4 is a magnified and exploded view of the hitch assembly.
Figure 5:
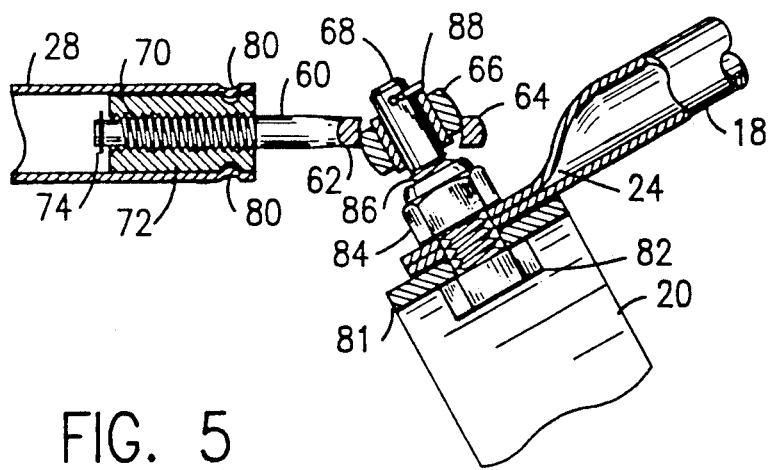
FIG. 5 is a sectional view of the hitch assembly in a tilted configuration.

The hitch assembly shown in FIGS. 3-5 provides substantially free movement between the bicycle and cart without binding, even when the bicycle falls on its side. The turning radius is 200 degrees and the swivel radius is 360 degrees. The pitch up and down is approximately 30 degrees. The hitch assembly includes a male rod 60 having a first end 62 integral with an annular housing 64. Housing 64 encloses a movable sleeve 66 having a central annular opening 67 with an interior diameter slightly larger than the outer diameter of pivot pin 68. The second end 70 of male rod 60 is threaded into rod end nut 72 and a clevis 74 prevents removal of rod 60. Rod end nut 72 is press fit into the first end opening 76 of tow bar 28. The second end 78 of tow bar 28 is bolted to yoke plate 38.

End nut 72 is retained within opening 76 by a swedge 80 as shown in FIGS. 3 and 5 or by welding.

The pivot pin 68 has an integral nut 82. The pivot pin 68 is inserted upwards through a bore in the top 81 of U-shaped vertical brace 20 and a bore through second end 24 of the lateral stabilizer bar 18. A locking nut 84 is screwed down over threads 86 in the pivot pin 68 to lock it into position. The swivel connector housing 64 is dropped over the pin 68 and a pintle clip 88 is threaded through a lateral bore 90 in a top portion of pin 68 to lock the swivel connector 64 in position.

The hitch and suspension system of this invention permit a swiveling of the trailer chassis 26 through a 200 degree turning ratio and prevents tipping of the trailer chassis 26 even if the bicycle 10 is tipped on its side.

Sleeve 66 turns within housing 64 when the bicycle is tilted as shown in FIG. 5.

The cart 52 of this invention can be made of a lightweight aluminum or steel or can be made from a polymer or from wood. The yoke can be made of a high strength aluminum or steel. The tension rods are made from steel and the tow bar from a hollow aluminum tube.

Equivalent elements can be substituted for the elements described above to achieve the same results set forth above in the same manner.

Having thus described the invention what is claimed and desired to be secured by Letters Patent is:

1. A bicycle trailer hitch and suspension apparatus for connecting a rear wheel of the bicycle with a cart comprising:

a cart having a front wall, a pair of side walls, a rear wall and bottom member attached together, the cart attached in a cantilevered position by its front wall by at least two brackets attached to a yoke, the yoke further having attached at opposite ends parallel pairs of tension rods having first and second ends, the tension rods extending rearwardly from the yoke, the first end of each pair of tension rods attached to the yoke and the second end of each pair of tension rods attached axially to an interior and exterior end respectively of a wheel axle, the cart side walls each located over an oppositely displaced interior tension rod, an upwardly curved tow bar attached at a first end to a middle portion of the yoke, a lower portion of the tow bar supporting a bracket attached to the front wall of the cart, a hollow second end of the tow bar having a horizontal rod mounted therein, the horizontal rod being integral at an end distal from the tow bar with a swivel connector, the swivel connector mounted on a pin uprightly projecting from a mounting position over the rear wheel of the bicycle.

2. The bicycle trailer hitch and suspension apparatus according to claim 1 wherein the mounting position for the uprightly projecting pin is a horizontal mounting bar connecting an upright frame member of the bicycle to a top portion of a U-shaped support brace connected at a first end to opposite sides of the bicycle rear axle and at a second end to the horizontal mounting bar at a position over the rear wheel of the bicycle, the pin passing upwardly through an end of the horizontal mounting bar and the top portion of the U-shaped support brace.

3. The bicycle trailer hitch and suspension apparatus according to claim 1 wherein the swivel connector is retained on the pivot pin by a pintle clip through a bore on a top portion of the pin.

* * * * *